United States Patent
Lattimore

(10) Patent No.: US 12,302,930 B2
(45) Date of Patent: May 20, 2025

(54) PROCESS FOR SWEET POTATO FERMENTATION AND DAIRY ALTERNATIVE PRODUCTS OBTAINED

(71) Applicant: Shawna Lattimore, Feasterville-Trevose, PA (US)

(72) Inventor: Shawna Lattimore, Feasterville-Trevose, PA (US)

(*) Notice: Subject to any disclaimer, the term of this patent is extended or adjusted under 35 U.S.C. 154(b) by 472 days.

(21) Appl. No.: 17/912,704

(22) PCT Filed: Mar. 15, 2021

(86) PCT No.: PCT/US2021/022302
§ 371 (c)(1),
(2) Date: Sep. 19, 2022

(87) PCT Pub. No.: WO2021/188407
PCT Pub. Date: Sep. 23, 2021

(65) Prior Publication Data
US 2023/0157334 A1    May 25, 2023

Related U.S. Application Data

(60) Provisional application No. 63/108,951, filed on Nov. 3, 2020, provisional application No. 62/992,256, filed on Mar. 20, 2020.

(51) Int. Cl.
A23L 19/10    (2016.01)
A23L 19/00    (2016.01)

(52) U.S. Cl.
CPC ............. *A23L 19/105* (2016.08); *A23L 19/09* (2016.08)

(58) Field of Classification Search
CPC .............................. A23L 19/09; A23L 19/105
See application file for complete search history.

(56) References Cited

FOREIGN PATENT DOCUMENTS

| | | | |
|---|---|---|---|
| CN | 107223710 | * | 3/2017 |
| CN | 108294108 | * | 7/2018 |
| CN | 108651622 | * | 10/2018 |
| JP | 2001-086929 A | | 4/2001 |
| KR | 10-2011-0106680 A | | 9/2011 |
| KR | 10-2011-0116329 A | | 10/2011 |
| KR | 101846277 | * | 4/2018 |

(Continued)

OTHER PUBLICATIONS

Translation for CN108294108 published Jul. 20, 2018.*

(Continued)

*Primary Examiner* — Anthony J Weier
(74) *Attorney, Agent, or Firm* — Wiggin and Dana LLP

(57) ABSTRACT

Provided herein are processes to ferment sweet potatoes and the dairy alternative food products produced thereof. Sweet potatoes and water are blended to obtain a smooth sweet potato mixture and then optionally strained. The mixture is optionally pasteurized and cooled to an incubation temperature to enable the addition of live cultures of fermentation microbes which create the characteristic aroma and sour tang of a fermented dairy product. The product is then subsequently refrigerated for storage. In other embodiments the process relies on wild type fermentation without the addition of commercially prepared or other prepared live microbes. Additives and foods can be incorporated during various stages of the processes.

15 Claims, 2 Drawing Sheets

(56) References Cited

FOREIGN PATENT DOCUMENTS

| KR | 10-2020-0012709 A | 2/2020 |
| WO | 2011131457 A1 | 10/2011 |
| WO | 2018098181 A1 | 5/2018 |

OTHER PUBLICATIONS

Translation for CN107223710 published Mar. 10, 2017.*
Translation for CN108651622 published Oct. 16, 2018.*
Translation for KR101846277 published Apr. 6, 2018.*
Translation for KR20110106680 published Sep. 29, 2011.*
Translation for KR20110116329 published Oct. 26, 2011.*
Yuliana, Neti et al., "Natural fermentation of orange sweet potatoes to produce brined pickle under different salt content", Asian Journal of Biological Sciences, 2020, vol. 13, pp. 113-118(published at Dec. 15, 2019).
International Search Report and Written Opinion dated Jul. 5, 2021 in connection with PCT International Application No. PCT/US2021/022302.
Supplementary European Search Report from European Application No. EP21770600; published Feb. 20, 2024.

* cited by examiner

PROCESS FOR SWEET POTATO FERMENTATION AND DAIRY ALTERNATIVE PRODUCTS OBTAINED

CROSS-REFERENCE TO RELATED APPLICATIONS

This application is a national phase entry under 35 U.S.C. § 371 of International Application PCT/US2021/022302, filed Mar. 15, 2021, which claims priority under 35 U.S.C § 119(e) to U.S. Provisional Application No. 62/992,256, filed Mar. 20, 2020 and to U.S. Provisional Application No. 63/108,951, filed Nov. 3, 2020 which are hereby incorporated by reference in their entirety herein.

FIELD OF THE INVENTION

The present invention provides processes for making sweet potato-based fermented dairy alternative food products. The present invention further provides food products prepared by these processes. These fermented sweet potato dairy alternative food products are free from traditional dairy and non-dairy sources such as animal milk, and can be formulated to be free from other potentially allergenic ingredients such as soy, grains, tree nuts, seeds, coconut, fruits, and certain legumes.

BACKGROUND OF THE INVENTION

Dairy refers to food products derived from the milk of mammals such as cows, sheep, goats, and other domesticated livestock. Fermented dairy products such as yogurt and cheese first appeared during the Neolithic period, 10,000-5,000 BCE. Fermentation is the chemical breakdown of substances by yeast, bacteria and other micro-organisms. Yogurt and cheeses are food products made from milk and the bacterial process of fermentation.

Traditionally, fermentation was achieved by allowing naturally occurring bacteria and other micro-organisms found on and in the substrate food product and in the air to metabolize sugars and other components of the food product. This is referred to as "wild" fermentation.

Fermentation can be achieved by other means, such as but not limited, to using ready-made cultures, adding probiotic supplements, inoculating with another already fermented food product or inoculating with another food which naturally contains fermenting micro-organisms. The fermentation process can take as little as several hours for a yogurt to several years for producing an aged cheese.

A variety of factors influence the rate of fermentation, and the taste and texture of the resulting product. These factors include the amount and type of fermentable sugars present, amount and type of fermenting micro-organisms present, temperature and length of time of incubation. For example, longer fermentation periods, and warmer incubation temperatures tend to yield a stronger smelling, more sour/tangy tasting, and thicker product. Note that incubation temperatures above 110° F. may have the unintended effect of killing the fermenting micro-organisms before the desired degree of fermentation is achieved.

While daily dairy consumption was once recommended, such daily consumption is now debated and controversial. Recent medical evidence has linked daily dairy consumption with serious medical conditions. Reports from nutritionists, scientists, physicians and other individuals show an increased risk of the following conditions that may be associated with daily dairy consumption: breast, ovarian and prostate cancer, bone weakness, obesity, hypertension, type 1 diabetes, heart disease, inflammation, hormonal disturbances, multiple sclerosis, lactose intolerance, and allergies and/or sensitivities. Lactose and other milk proteins can cause sensitivities in many individuals. It is estimated that 65% of the human population is actually lactose intolerant. Some populations, such as in Africa and Asia have a rate of lactose intolerance as high as 90%.

Plant-based or non-dairy milk alternatives are "milks" derived from plant foods such as nuts, seeds, grains, coconuts, fruits, soy, and certain legumes. Other than having lactose intolerance, many people prefer plant-based foods and alternatives to animal dairy foods for health, ecological, economical, animal rights, ethics, moral, and spiritual reasons. The environmental impact of plant-based milks, such as greenhouse gas emissions, water use, and land use, in general is significantly lower than for dairy milks. Sweet potatoes have one of the lowest water footprint calculations compared to currently used plant-based dairy alternative sources. Sweet potatoes do not require soaking, grinding, shelling, hulling, milling and/or chemical processing that other plant-based milks may require, and thus less water is used in growing and processing sweet potatoes.

Certain dairy alternatives based on sources such as grains and nuts must be avoided by individuals who exhibit sensitivities or allergies to these products. Also, concerns regarding genetically modified soy products and hormonal side effects due to soy consumption have led to a decline in the popularity of soy-based dairy alternative products. As seen from the foregoing, there is a need for new non-dairy milk alternatives that are hypoallergenic, environmentally friendly and that cause less health concerns.

SUMMARY OF THE INVENTION

The present disclosure provides a process for making sweet potato-based fermented dairy alternative foods. Instead of using dairy and other plant-base alternatives, the present disclosure uses sweet potato to make fermented dairy alternative foods. Furthermore, the present disclosure includes weighing an amount of a sweet potato to reach a sweet potato content of about 2% to about 99.9% by weight, weighing an amount of a liquid to reach a liquid content of approximately about 0.1% to about 98% by weight, blending said sweet potato and said liquid until a smooth mixture is obtained, optionally straining the mixture to remove undesirable particles, optionally pasteurizing the mixture, bringing the mixture to an incubation temperature, inoculating the mixture with a starter culture, and incubating the mixture at the incubation temperature to obtain the fermented product.

Another aspect of this disclosure is a fermented dairy alternative food which is produced from a sweet potato mixture and fermentation microbes.

In another aspect of this disclosure is a fermented dairy alternative food, in which the sweet potato is fermented with no starter cultures added by human intervention, i.e. "wild fermentation". In this aspect the sweet potato mixture would generally not be cooked or pasteurized to benefit from the fermentation microbes naturally present in the sweet potatoes.

In another aspect the present invention provides a method of making a sweet potato-based fermented dairy alternative food product, comprising the steps of:
(a) weighing an amount of a sweet potato to reach a sweet potato content of about 2% to about 99.9% by weight;
(b) weighing an amount of an optional liquid to reach a liquid content of 0.1% to about 98% by weight;

(c) blending said sweet potato and said optional liquid until a mixture is obtained;
(d) optionally, pasteurizing said mixture;
(e) bringing said mixture to an incubation temperature;
(f) inoculating said mixture with a starter culture; and
(g) incubating said mixture at said incubation temperature to obtain the fermented dairy alternative food.

In another aspect the present invention provides a method further comprising the step (h) of cooling said mixture to below 4° C. for storage.

In another aspect the present invention provides a method wherein said sweet potato in step (a) is cooked.

In another aspect the present invention provides a method wherein said mixture is optionally strained to remove any undesirable particles after step (c).

In another aspect the present invention provides a method wherein said amount of said sweet potato in step (a) is 49.96% by weight.

In another aspect the present invention provides a method wherein said amount of said liquid in step (b) is 49.96% by weight.

In another aspect the present invention provides a method wherein said liquid is water.

In another aspect the present invention provides a method wherein the pasteurizing step (d) comprises heating said mixture to about 90° C. and maintaining the mixture at this temperature for approximately 6 minutes.

In another aspect the present invention provides a method wherein said incubation temperature is 43° C.

In another aspect the present invention provides a method wherein said incubation step (g) is run for about 8 hours.

In another aspect the present invention provides a method wherein said starter culture comprises 0.08% by weight.

In another aspect the present invention provides a method wherein said sweet potato and said liquid is approximately in a 1:1 weight:weight ratio.

In another aspect the present invention provides a method wherein said liquid is selected from the group consisting of fruit juice, broth, puree, milk (e.g., plant-based or dairy), or any combination thereof.

In another aspect the present invention provides a method wherein said starter culture is a lactic acid bacteria (LAB).

In another aspect the present invention provides a method wherein said starter culture is selected from the group consisting of *Bifidobacterium bifidum*, *Bifidobacterium lactis*, *Lactobacillus acidophilus*, *Lactobacillus casei*, *Lactobacilus delbrueckii* subsp *bulgaricus*, *Lactobacillus rhamnosus*, *Streptococcus thermophilus*, *Lactococcus lactis* subspecies *lactis*, *Lactococcus lactis cremoris*, or any combination thereof.

In another aspect the present invention provides a method wherein said starter culture is a probiotic supplement powder.

In another aspect the present invention provides a method wherein said starter culture is another already fermented food.

In another aspect the present invention provides a method wherein said sweet potato is raw sweet potato.

In another aspect the present invention provides a method wherein said sweet potato is cooked sweet potato.

In another aspect the present invention provides a method wherein said sweet potato is a Murasaki sweet potato cultivar.

In another aspect the present invention provides a method further comprising the addition of one or more ingredients selected from the group consisting of flavorants, flavorings, sweeteners, acidifiers, preservatives, fats, oils, nutritional supplements, texturizing agents, thickeners, and combinations thereof.

In another aspect the present invention provides a method wherein said sweet potato-based fermented dairy alternative food product is selected from the group consisting of yogurt, cheese, kefir, buttermilk, sour cream, crème fraiche, fermented milk, fermented creamer, drinkable yogurt, and frozen yogurt alternatives.

In another aspect the present invention provides a method of making a sweet potato-based wild fermented dairy alternative food product, comprising the steps of:
(a) weighing an amount of a raw whole, cut, sliced, chopped, or shredded sweet potato to reach a sweet potato content of about 2% to about 99.9% by weight;
(b) weighing an amount of optional salt to reach a content of 0% to about 5% by weight, or weighing an amount of optional water to reach a liquid content of 0% to about 98%, or weighing an amount of optional brine having a salinity content of about 0.5% to about 20% to reach a liquid content of 0% to about 98% by weight;
(c) blending said sweet potato and said optional component from step (b) until a mixture is obtained; and
(d) incubating said mixture at said incubation temperature to obtain the fermented dairy alternative food product.

In another aspect the present invention provides a method further comprising the step (e) of cooling said mixture to below 4° C. for storage.

In another aspect the present invention provides a method of making a sweet potato-based wild fermented dairy alternative food product wherein (i) said sweet potato of step (a) further comprises naturally occurring fermentation microbes and/or (ii) said mixture obtained in step (c) further comprises naturally occurring fermentation microbes, which naturally inoculate the sweet potato or the mixture from within, or from the air or the surroundings.

In another aspect the present invention provides a fermented dairy alternative food product prepared according to the methods of the present invention.

In another aspect the present invention provides a wild fermented dairy alternative food product prepared according to the methods of the present invention.

These and other aspects of the present invention will become apparent from the disclosure herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings.

DETAILED DESCRIPTION OF THE INVENTION

Figure 1:
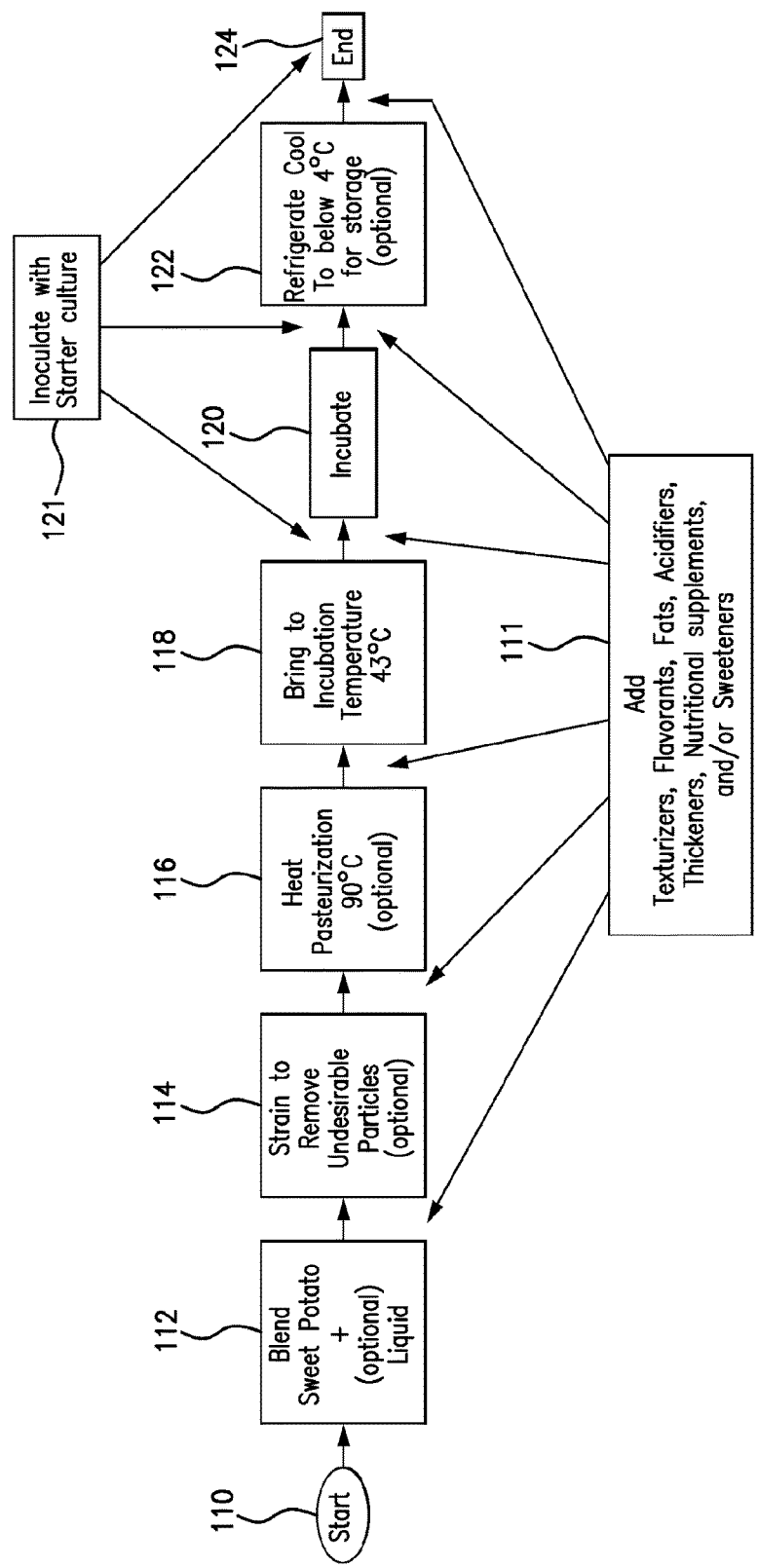
FIG. 1 is an exemplary illustration of the steps in a process for sweet potato fermentation including an optional pasteurization step and inoculation with a starter culture of fermentation microbes. Other optional steps are also shown.

The present invention includes a method of fermenting sweet potato and the dairy alternative products obtained thereof. Dairy-free plant-based yogurts are now replacing the popular dairy-based yogurts. One look at supermarket refrigerated cases will attest to the numerous flavors, brands and types of plant-based yogurt and cheese alternatives demanded by consumers. These plant-based yogurt and cheese alternatives are generally made with soy, grains, tree nuts, seeds, coconut, fruits, or certain legumes. Other than yogurt and cheese, sweet potato dairy alternative products can include but are not limited to kefir, buttermilk, sour cream/crème fraiche, fermented milk, fermented creamer, and drinkable yogurt alternatives and frozen yogurt alternatives. All of these types of fermented dairy alternative products can be obtained with sweet potatoes by person of ordinary skill in the art based on the present invented process.

Sweet potato, *Ipomoea batata*, from the morning glory family, has not been used as a base for plant-based dairy alternative food products. The fermented sweet potato products described in this invention are free from traditional dairy sources such as dairy (animal milk). Also, the products in certain embodiments can be formulated to be free of further, potentially allergenic ingredients such as soy, grains, tree nuts, seeds, coconut, fruits, or legumes. In some regards, sweet potato is a superior choice for the base ingredient of plant-based dairy alternatives. The common potato, *Solanum tuberosum* of the night shade family, is toxic when eaten raw. In contrast, the sweet potato, which is not of the night shade family, is hypoallergenic, and the entire sweet potato, including vegetation and its tubers, can all be consumed raw. This feature also allows fermentation with either raw or cooked sweet potatoes.

Sweet potatoes are different from yams, although they are both underground tuberous vegetables. The scientific name for yams is *Dioscorea*. Yams belong to the family Dioscoreaceae, while sweet potatoes are from the morning glory family. Sweet potatoes are sweeter than yams, and yams are much starchier and drier than sweet potatoes. The lower sugar content and the inferior texture of yams make yams less desirable for use as a dairy alternative plant-based source compared to sweet potatoes. Furthermore, sweet potatoes have thin, smooth skins, whereas yams have rough, dark skins. The rougher and darker skin of yams make them less preferable to be used as a dairy alternative plant-based source before peeling.

Sweet potatoes are superb for their rich nutrients and the advantages provided based on health, economic and environmental issues. The sweet potato is touted by some as a "superfood" because it contains zero cholesterol and saturated fat. Sweet potatoes are a good source of potassium, fiber, vitamin A, complex carbohydrates, trace vitamins, and minerals. For economic reasons, sweet potatoes are promoted in developing and impoverished nations to help solve the problems of hunger and starvation. The United Nations Food and Agriculture Organization has stated that "sweet potatoes are the most efficient staple food to grow in terms of farmland."

There are about 6500 varieties of sweet potatoes with varying physical, chemical and nutritional characteristics. Any type of sweet potato can be used to make a fermented dairy alternative food product. An orange-fleshed variety can give a better appearance for producing a cheddar cheese alternative product. In our preferred embodiment, Murasaki sweet potatoes are fermented. Despite its Japanese name, the Murasaki sweet potato was developed in the United States at Louisiana State University in the 2000s. The Murasaki sweet potato is purple skinned with a creamy white flesh. The white flesh more closely resembles the coloring of animal dairy. Other sweet potatoes could also be substituted. The Murasaki variety is noted for its greater potassium, Vitamin A, Vitamin C, fiber and sugar content. Murasaki sweet potatoes have a higher average sugar content than other varieties of sweet potatoes, which provides fuel for fermentation bacteria and can accelerate the fermentation. Other sweet potato varieties useful herein include, but are not limited to, Beauregard, Covington, Bonita, Garnet, Jewell, Nemagold, Centennial, Southern Delite, Hernandez, Regal, Bush, Travis, Excel, Vardaman, White Delight, Sumor, Picadita, Nancy Hall, Boniato, Campeon, Allgold, Apache, Brinkley White, Bunch Porto Rico, Carolina Ruby, Cherokee, Continental Red, Cordner, Cordner's Red, Dianne, Georgia Jet, Yellow Hannah, Sweet Hannah, Hayman, Porto Rico, White Delight, and White Hamon Sweet Potatoes. Furthermore, any combination of sweet potato varieties can be used.

Traditional fermented dairy is a milk product that contains characteristic bacterial cultures. In sweet potato fermented dairy alternatives, similar bacterial cultures can be used. Different bacterial strains produce different flavor profiles and the strains may be used in combination. In one embodiment, the bacteria used for sweet potato fermentation includes lactic acid bacteria (LAB) obtained from Getculture Inc. The strains of bacteria may include but are not limited to, *Bifidobacterium bifidum, Bifidobacterium lactis, Lactobacillus acidophilus, Lactobacillus casei, Lactobacilus delbrueckii* subsp *bulgaricus, Lactobacillus rhamnosus, Streptococcus thermophilus, Lactococcus lactis* subspecies *lactis, Lactococcus lactis cremoris*, and any combination thereof.

The sugars in sweet potatoes fuel the bacteria, which are needed for fermentation. Sweet potatoes naturally contain maltose, sucrose, fructose and glucose. Cooking sweet potatoes can double and even triple the availability of the sugar content as the starches break down into their sugar components. In some embodiments that use raw sweet potato or sweet potato flour, additional sugars may be added to support proper bacterial fermentation. However, it is important not to add additional sugars too early in the process to avoid production of undesirable side products such as ethanol. Therefore, the timing and amount of the addition of optional sugars should be carefully controlled. Examples of additional sugars include those selected from the group consisting of glucose, fructose, lactose, sucrose, galactose, maltose, mannose, and combinations thereof. The sugar can be provided from various sources and can also include corn syrup, high fructose corn syrup, invert sugar, and any of the sugars recited in the previous sentence in various forms of refinement.

FIG. 1 is an exemplary illustration of the steps in the process for sweet potato fermentation. The process starts 110 with blending sweet potato and liquid together 112. Then optionally, the obtained mixture is strained to remove undesirable particles 114. Subsequently, pasteurization is optionally performed by heating the mixture to 90° C. 116. The following step is to then cool the product to an incubation temperature at which it is inoculated with a bacterial culture, which is preferably 43° C. 118. The mixture may then be inoculated with the starter culture 121 and incubated at a temperature appropriate for the starter culture used 120. Optionally, the mixture may be inoculated with starter culture 121 before and/or after the incubation step 120. After the incubation and fermentation 120, the resultant product is optionally refrigerated, i.e. cooled to below 4° C. for storage 122. Optionally, the mixture may be inoculated with starter culture 121 before and/or after the refrigeration step. The process then comes to an end 124. At various stages during the process, texturizers, flavorants, fats, acidifiers, thickeners, nutritional supplements and/or sweeteners can be added 111 between or at any steps after blending 112.

A preferred embodiment of the invention begins with blending cooked sweet potatoes and water to obtain a smooth sweet potato mixture, which is then strained. The mixture is pasteurized and cooled to enable the addition of live cultures which create the characteristic aroma and sour tang of a fermented dairy product. Then the product is incubated to allow fermentation and subsequently refrigerated for storage. Additives and foods may be incorporated during various stages of the process.

In one embodiment, the steps of preparing a dairy alternative product based on fermented sweet potato include: (1) weighing cooked and peeled sweet potato amount to reach a potato content of approximately 49.96% by weight; (2) weighing the amount of water needed to reach a water content of approximately 49.96% by weight; (3) blending the sweet potato and water until a smooth mixture is obtained; (4) optionally straining the mixture to remove undesirable particles and to create a smoother texture; (5) optionally heating the mixture to 90° C. and holding at this temperature for 6 minutes to pasteurize the product; (6) cooling the product to an incubation temperature, which is 43° C.; (7) inoculating the mixture with a starter culture, 0.08% by weight; (8) incubating the inoculated mixture at 43° C. for 8 hours to obtain the resultant fermented product; and (9) optionally cooling the fermented product to below 4° C. for storage.

In one embodiment, step (7) the pasteurized mixture is inoculated with Getculture Inc.'s culture mix product Dairy Free Yogurt culture vegetal mix, which includes *L. bulgaricus, S. thermophilis, Bifidobacterium bifidum, Bifidobacterium lactis, Lactobacillus acidophilus, Lactobacillus casei,* and *Lactobacillus rhamnosus*.

In some embodiments, the pasteurization in step (5) can vary in time and in temperature. In one embodiment, the pasteurization step (5) is omitted.

In some embodiments, sweet potatoes with white flesh, higher sugar content, or creamy textures are preferred. Sweet potatoes with white flesh produce products having a more dairy-like appearance. Higher sugar content can better fuel the bacteria and accelerate the fermentation. Sweet potatoes with a creamy texture give the product a dairy-like mouthfeel. In one embodiment, Murasaki sweet potatoes are used in the process. Murasaki sweet potatoes have a white and creamy flesh, which makes the product have dairy-like appearance and texture.

In some embodiments, the sweet potato mixture is made with raw sweet potatoes instead of cooked sweet potatoes. Additional sugars may be added to help the fermentation process. In some other embodiments, the sweet potato mixture is made with sweet potato flour. Additional sugars may also be added. In yet some other embodiments, the sweet potatoes mixture is made with cooked sweet potatoes, raw sweet potatoes, sweet potato flour, and any combination thereof. Additional sugars may be added into the mixture.

In some embodiments, the used sweet potatoes are unpeeled.

In some embodiments, the percentage of cooked sweet potatoes, raw sweet potatoes, sweet potato flour, or any combination thereof, ranges from about 2% to about 99.9% by weight. Other useful ranges are from about 10% to about 90% by weight, and from about 15% to about 80% by weight.

The percentage of sweet potato and water, i.e. the relative amounts of sweet potato and water, will depend on the desired product and its desired consistency. For example, a "milk" is more liquid and therefore, its percentage of liquid will be higher. A "cheese" is a denser food product and requires less liquid. For a thin or liquid-like consistency, such as a sweet potato milk, use about 2% to about 25% by weight sweet potato. For a medium consistency product, such as "yogurt" or "sour cream", use about 26% to about 60% by weight. For denser or drier food products such as a "cheese", use about 60% to 100%, by weight sweet potato.

In some embodiments, the sweet potato mixture is made by adding water. In some other embodiments, the sweet potato mixture is made by adding other liquids including but not limited to, juices, broths, purees, milks (e.g., plant-based and/or dairy), and/or any combination thereof. The weight percentage of added liquid used will depend on the desired product and its desired consistency. For a thin or liquid-like consistency such as sweet potato milk use about 75% to about 98% by weight liquid. For a medium consistency product such as a yogurt, use about 40% to about 75% by weight liquid. For denser or drier food products such as cheeses, use 0% to about 40% liquid. Because water containing chlorine and other chemicals may retard fermentation, the use of de-chlorinated, filtered water can be advantageous.

In some embodiments, flavorants or flavoring may be added. Such flavorants or flavorings include but are not limited to, vanilla, chocolate, fruits, vegetables, nuts, seeds, nutritional yeast, spices, herbs, smoke, salt, citric acid, vinegar, and/or any combination thereof. These flavorants or flavorings may be in the form of, but not limited to, whole foods, pastes, powders, extracts, syrups, semi-solids, and liquids. In some embodiments, the flavorant or flavoring, such as salt or substances that elevate or lower pH, may retard fermentation. In some embodiments, the fermentation time is adjusted according to the retarded or accelerated fermentation caused by additives.

In some embodiments, sweetener may be added. Such sweetener can be, but not limited to, sugar, honey, stevia, artificial sweetener, agave syrup, maple syrup, and/or any combination thereof. These sweeteners can be added at different stages in the process. If the sweeteners contain sugar, they may be subject to fermentation. Examples of additional sugars include those selected from the group consisting of glucose, fructose, lactose, sucrose, galactose, maltose, mannose, and combinations thereof. The sugar can be provided from various sources and can also include corn syrup, high fructose corn syrup, invert sugar, and any of the sugars recited in the previous sentence in various forms of refinement.

In some embodiments, acidifier may be added. Such acidifier can be, but not limited to, citric acid, lemon juice, vinegar, and/or any combinations thereof.

In some embodiments, preservatives may be added. Such preservatives include, but are not limited to, salt, sorbate, benzoate and, natamycin.

In some embodiments, fat can be added to the mixture. Such fat can be, but not limited to, any plant-derived fat such as, nut or seed oils, coconut oil, olive oil, vegetable oil, grapeseed oil, corn oil, walnut oil, avocado oil, any animal or dairy derived fat, and/or any combination thereof. Fat can be added by blending fat into the mixture. Fat may be also be added before fermentation, after fermentation or after refrigeration.

In some embodiments, nutritional supplements can be added. Such nutritional supplement includes, but is not limited to, protein, nutritional yeast, fiber, vitamins and minerals, and/or any combination thereof. The added vitamins can include, but not limited to, vitamin A, vitamin C, vitamin D, vitamin E, vitamin K, vitamin B1, vitamin B2, vitamin B3, vitamin B5, vitamin B6, vitamin B7, vitamin B9 (folic acid or folate), vitamin B12 and/or any combinations thereof. The added mineral includes, but not limited to, essential nutrients for human body such as calcium, iron, magnesium, sodium, zinc, boron, sulfur, phosphorus, selenium, iodine, potassium, and/or combinations thereof.

In some embodiments, texturizing and/or thickening agent is added. Such texturizing or thickening agent includes, but is not limited to, pectin, gum, agar-agar, tapioca, flours, starches, emulsifier, and/or any combinations thereof. The added emulsifier can be, but is not limited to, sunflower oil, lecithin, or xanthan gum or other gums, and/or any combinations thereof.

In some embodiments, the bacterial strains for fermentation may include one or any combination of two or more live cultures. Such live cultures include, but not limited to, *L. bulgaricus* and *S. thermophilis*, *Bifidobacterium bifidum*, *Bifidobacterium lactis*, *Lactobacillus acidophilus*, *Lactobacillus casei*, *Lactobacillus rhamnosus*, *Lactococcus lactis* subspecies *Lactis*, and *Lactococcus lactis cremoris*. The amount of live cultures added will depend on the source of the live culture, e.g., commercially prepared dairy starter, probiotic supplement powder or previously fermented food; and on the desired sourness/tanginess of the product as well as the desired fermentation time. In our examples, using the specific commercially produced live culture, for a less sour/tangy taste and/or longer fermentation time, one can use about 0.12% to about 0.2%, by weight live cultures. For a medium sourness level and/or medium length fermentation time, use about 0.10% to about 0.16% by weight. For a higher sour/tangy taste and/or shorter fermentation time, use about 0.15% to about 2% by weight. It should be noted that if a "wild" fermentation is desired, no live starter culture is added.

In some embodiments, fermentation microbes can be obtained from probiotic supplement powder.

In some embodiments, fermentation microbes can be added using another already fermented food, e.g. yogurt.

In some embodiments, no additional fermenting microbes are added. The naturally occurring fermentation microbes from the sweet potato and/or from the surrounding air can be used to ferment the sweet potatoes.

When using the "wild fermentation" technique, combining the substrate food with salt, water, or brine encourages the growth of beneficial lactic acid bacteria, while discouraging the growth of potentially harmful microbes. Smaller sweet potato pieces and less salt quickens the fermentation process.

Figure 2:
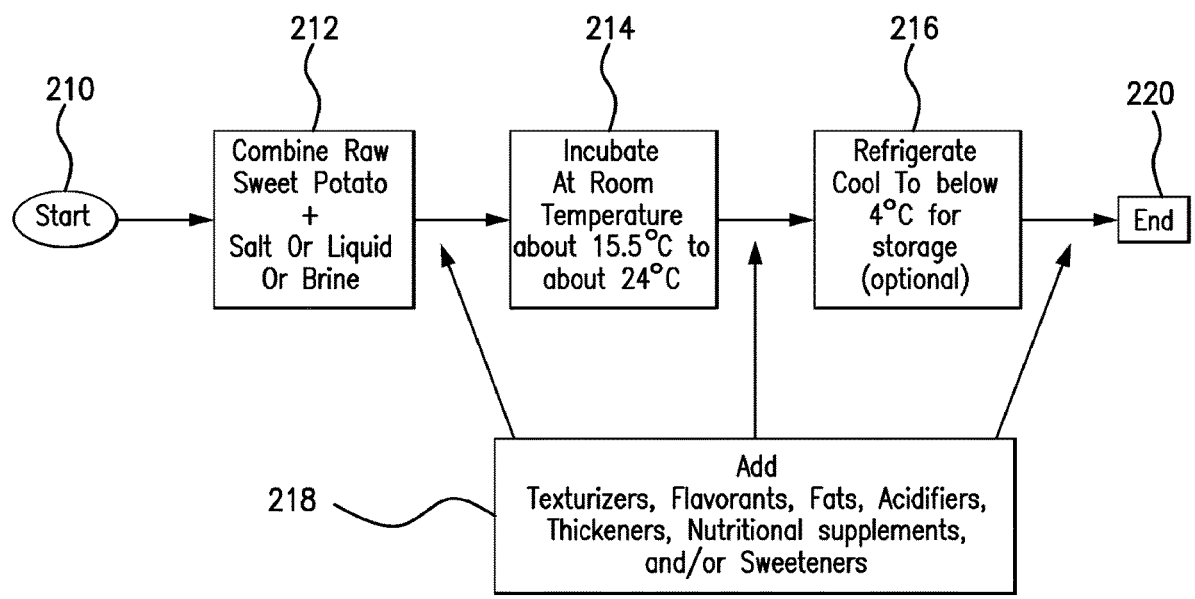
FIG. 2 is an exemplary illustration of the steps in a process for the wild fermentation of sweet potato.

FIG. 2 is an exemplary illustration of the steps in the wild process for sweet potato fermentation. The process starts 210 with combining raw whole, sliced, chopped, or shredded sweet potato and an optional liquid such as water, and/or an optional amount of salt, and/or an optional amount of brine 212. For example, if water is not used, then salt can be added. Alternatively, brine, which is a mixture of water and salt, can be added. The mixture is then brought to an incubation temperature, which is preferably at about room temperature or below, i.e. about 15.5° C. to about 24° C. to ferment 214. After the fermentation, the product may be refrigerated and cooled to below 4° C. for storage 216, then this process comes to an end 220. At various stages during the process, texturizers, flavorants, fats, acidifiers, thickeners, nutritional supplements and/or sweeteners can be added 218 between any steps after blending 212.

In some embodiments a curdling agent is added. Such curdling agents include, but are not limited to, rennet.

In some embodiments, the incubation time range is inclusive but not limited to, about 1 hour to about 48 hours. In some other embodiments, there is a quick fermentation of about 1 to about 6 hours. In other embodiments, there is a moderate fermentation of about 6 to about 24 hours. In other embodiments there is a long fermentation of about 24 to about 72 hours. In other embodiments, for wild fermentation times can range from about 24 hours to about 1 month. If incubation in "wild fermentation" is performed at temperatures below about 18.3° C., incubation times can reach more than about 6 months.

In some embodiments, sterilization or pasteurization may be performed.

In some embodiments, the fermented product may be consumed immediately or allowed to further ferment. The product may be further strained and/or stored in conditions which retard spoilage.

In some embodiments, the product is stored in conditions which retard spoilage but may promote additional fermentation. Such conditions include, but are not limited to, approximately 3.3-12.7° C. (38-55° F.) for a time period until the desired degree of fermentation is achieved.

In some embodiments, the fermented mixture can be frozen.

In some embodiments, peeled or unpeeled sweet potatoes are weighed and combined with any desired amount of sweet potato vegetation, such as vines and leaves, to reach a preferred content by weight.

EXAMPLES

The following examples further describe and demonstrate embodiments within the scope of the present invention. The Examples are given solely for the purpose of illustration and are not to be construed as limitations of the present invention, as many variations thereof are possible without departing from the spirit and scope of the invention.

Example 1: Process for Making Dairy Alternatives with Fermented Sweet Potatoes

| Ingredients: | Amount* |
|---|---|
| Sweet potato, any variety | 2%-99.9% |
| Filtered water | 0%-98% |
| Fermentation microbes | 0.01%-2% |
| (amount will vary according to the type used) | |
| For example, use Getculture, Inc. brand Dairy-Free Yogurt Culture Contains: *Bifidobacterium bifidum*, *Bifidobacterium lactis*, *Lactobacillus acidophilus*, *Lactobacillus casei*, *Lactobacilus delbrueckii subsp bulgaricus*, *Lactobacillus rhamnosus*, *Streptococcus thermophilus*, rice, maltodextrin | |

*Weight percent

Optional Ingredients:

Flavorants—Such flavorants or flavorings include but are not limited to, vanilla, chocolate, fruits, vegetables, nuts, seeds, nutritional yeast, spices, herbs, smoke, salt, citric acid, vinegar, and/or any combination thereof. These flavorants or flavorings may be in the form of, but not limited to, whole foods, pastes, powders, extracts, syrups, semi-solids, and liquids.

Texturizers—Such texturizing or thickening agent includes, but is not limited to, pectin, gum, agar-agar, tapioca, flours, starches, emulsifiers, and/or any combinations thereof. The added emulsifier can be, but is not limited to, sunflower oil, lecithin, or xanthan gum or other gums, and/or any combinations thereof.

Fat—Such fat can be, but not limited to, any plant-derived fat such as, nut or seed oils, coconut oil, olive oil, vegetable oil, grapeseed oil, corn oil, walnut oil, avocado oil, any animal or dairy derived fat, and/or any combination thereof.

Sweeteners—Such sweetener can be, but not limited to, sugar, honey, stevia, artificial sweetener, agave syrup, maple syrup, and/or any combination thereof.

Acidifiers—Such acidifier can be, but not limited to, citric acid, lemon juice, vinegar, and/or any combinations thereof.

Curdling agents—Such curdling agent includes, but not limited to, rennet.

Nutritional supplements—Such nutritional supplement includes, but is not limited to, protein, fiber, nutritional yeast, vitamins and minerals, and/or any combination thereof. The added vitamins can include, but not limited to, vitamin A, vitamin C, vitamin D, vitamin E, vitamin K, vitamin B1, vitamin B2, vitamin B3, vitamin B5, vitamin B6, vitamin B7, vitamin B9 (folic acid or folate), vitamin B12, and/or any combinations thereof. The added mineral includes, but not limited to, essential nutrients for human body such as calcium, iron, magnesium, sodium, zinc, boron, sulfur, phosphorus, selenium, iodine, potassium, and/or any combinations thereof.

Process:

Cook the sweet potatoes. Remove the peel. If using raw potatoes, peel the sweet potatoes, then shred or chop.

Blend with required amount of water.

Bring the sweet potato to incubation temperature.

Inoculate the mixture with fermenting microbes. These microbes may consist of commercially prepared lactic acid producing bacterial culture and/or probiotic supplement powder.

Incubate. Incubation temperature may be maintained by a variety of means, such as a yogurt maker, low temperature oven, slow cooker or kept at room temperature, etc. Incubate until the desired fermentation is achieved.

The resulting product is ready for consumption or storage in refrigeration.

The sweet potato ferment can be used to make a variety of dairy alternative products such as: yogurt, cheese, milk etc.

Additional, optional processes:

Pasteurization:

Pasteurization can be performed at any time during the preparation. Pasteurization will kill bacteria, both harmful and beneficial. It increases food safety and extends the time for safe consumption.

Example 2: Fermented Sweet Potato Dairy Alternative Preferred Embodiment

| Ingredients: | Amount |
| --- | --- |
| Murasaki sweet potato, cooked, peeled and large fibers removed (other sweet potatoes may be used) | 49.96% |
| Filtered water | 49.96% |
| Yogurt Culture (Getculture, Inc. brand Dairy-Free Yogurt Culture) | 0.08% |

* Weight percent

Process:

Pressure cook 2 medium whole sweet potatoes until soft, about 45 minutes.

Peel and remove fibers and particles by using a ricer or food mill.

Combine the sweet potato and water in a pot. Using an immersion blender, blend until sweet potato particles are very fine and sweet potatoes are completely blended into water, approx. 60 seconds.

To pasteurize, heat the mixture to 180 degrees F. (82.2 degrees C.) and hold for 6 minutes.

Allow the mixture to cool to incubation temperature, for our commercially prepared lactic acid bacteria, a temperature of 100-110 degrees F. (37.8-43.3 degrees C.) is required.

Add yogurt culture. Whisk vigorously to ensure even distribution.

Incubate until desired fermentation has been achieved. We incubated our preferred embodiment in a Cuisine brand Yogurt and Greek Yogurt Maker for 8 hours.

The product is now ready for consumption or storage in refrigeration.

Example 3: Fermented Sweet Potato Greek Style Yogurt Alternative

| Ingredients: | Amount* |
| --- | --- |
| Murasaki Sweet potatoes, cooked, peeled and large fibers removed | 39.91% (13 oz) |
| Filtered water | 58.33% (19oz) |
| Calcium powder (Pomona brand) | 1% (2 tsp) |
| Pectin powder (Pomona brand) | 0.07% (2 tsp) |
| Yogurt Culture (Getculture, Inc. brand Dairy-Free Yogurt Culture) | 0.02% (1/4 tsp.) |

*Weight percent or total amount to add.

Process:

Pressure cook the sweet potatoes.

Peel and remove fibers and particles by using a ricer or food mill.

Combine the sweet potato and water in a pot. Using an immersion blender, blend until the sweet potato particles are very fine, about a minute.

Add the calcium powder to the mixture and stir.

To pasteurize, heat the mixture to 180 degrees F. (82.2 degrees C.) and hold for 6 minutes.

Add pectin powder to the mixture at 180 degrees F. (82.2 degrees C.). Whisk vigorously until the pectin is dissolved completely.

Allow the mixture to cool to incubation temperature, for our commercially prepared lactic acid bacteria, a temperature of 100-110 degrees F. (37.8-43.3 degrees C.) is required.

Add yogurt culture. Whisk vigorously to ensure even distribution.

Incubate until desired fermentation has been achieved. We incubated in a Cuisine brand Yogurt and Greek Yogurt Maker for 8 hours.

The product is now ready for consumption or storage in refrigeration.

Example 4: Fermented Sweet Potato Creamer Alternative

| Ingredients: | Amount* |
| --- | --- |
| Murasaki Sweet Potato, cooked, peeled, and large fibers removed | 2.28% (0.8 oz) |

-continued

| Ingredients: | Amount* |
| --- | --- |
| Filtered water | 88.74% (31.2 oz) |
| Probiotic powder from supplement capsules (The Vitamin Shoppe-Ultimate 10+ Probiotics) | 0.17% (4 capsules) |
| Calcium citrate from supplement capsules (Solaray-Calcium Citrate 250 mg per capsule) | 0.4% (4 capsules) |
| Grapeseed oil | 8% (2 tsp.) |
| Fine sea salt | 0.09% (1/8 tsp.) |
| Pure Vanilla Extract | 0.21% (1/2 tsp.) |
| Xanthan gum | 0.11% (1/4 tsp.) |

*Weight percent or total amount to add.

Process:

Pressure cook 1 whole sweet potato until soft, about 45 minutes.

Peel and remove fibers and particles by using a ricer or food mill.

Combine the sweet potato and water in a pot. Using an immersion blender, blend until the sweet potato particles are very fine, about a minute.

To pasteurize, heat the mixture to 180 degrees F. (82.2 degrees C.) and hold for 6 minutes.

Allow the mixture to cool to incubation temperature, 100-110 degrees F. (37.8-43.3 degrees C.).

Add probiotic powder to the mixture. Whisk vigorously to ensure even distribution.

Incubate until desired fermentation has been achieved. We incubated in a Cuisine brand Yogurt and Greek Yogurt Maker for 2 hours.

Pour sweet potato mixture into blender. Add oil, salt and vanilla. Blend 10 seconds.

Add Xanthan gum. Blend 30 seconds.

The product is now ready for consumption or storage in refrigeration.

Example 5: Sweet Potato Fermented Chocolate Milk Alternative

| Ingredients: | Amount* |
| --- | --- |
| Murasaki Sweet Potato, cooked, peeled, and large fibers removed | 2.91% (1 oz) |
| Filtered water | 49.5% (17 oz) |
| Apple juice | 40.77% (14 oz) |
| Probiotic powder from supplement capsules (The Vitamin Shoppe-Ultimate 10+ Probiotics) | 0.17% (4 capsules) |
| Calcium citrate from supplement capsules (Solaray-Calcium Citrate 250 mg per capsule) | 0.41% (4 capsules) |
| Cocoa powder (Nestle's Special Dark) | 0.77% (1 tbsp) |
| Honey | 1.16% (1/2 tbsp) |
| Grapeseed oil | 4.15% (1 tbsp) |
| Fine sea salt | 0.09% (1/8 tsp) |
| Xanthan gum | 0.07% (1/8 tsp) |

*Weight percent or total amount to add.

Process:

Combine the sweet potato and water in a pot. Using an immersion blender, blend until the sweet potato particles are very fine, about one minute.

To pasteurize, heat the mixture to 180 degrees F. (82.2 degrees C.) and hold for 6 minutes.

Allow the mixture to cool to incubation temperature, 100-110 degrees F. (37.8-43.3 degrees C.).

Add probiotic powder to the mixture. Whisk vigorously to ensure even distribution of culture in the mixture.

Incubate until desired fermentation has been achieved. We incubated in a Cuisine brand Yogurt and Greek Yogurt Maker for 1 hour.

Pour sweet potato mixture into a blender. Add apple juice, oil, cocoa powder, honey and salt. Blend 20 seconds.

Add Xanthan gum. Blend 30 seconds.

The product is now ready for consumption or storage in refrigeration.

Example 6: Fermented Sweet Potato Meltable Cheddar Cheese Alternative

| Ingredients: | Amount |
| --- | --- |
| Orange Fleshed Sweet Potato, cooked, peeled, and large fibers removed | 62.43% (10 oz.) |
| Filtered Water | 37.45% (6 oz.) |
| Yogurt Culture (Getculture, Inc. brand Dairy-Free Yogurt Culture) | 0.12% (1/8 tsp) |
| Fermented sweet potato | 1 cup |
| Agar-agar (flakes) | 2 tbsp |
| Filtered Water | ½ cup |
| Refined Coconut Oil | ¼ cup |
| Nutritional Yeast | 7 tbsp |
| Extra Virgin Olive Oil | ½ cup |
| Brown Miso Paste | 2 tbsp |
| Citric acid | ⅛ tsp |
| Tapioca flour | 2.5 tbsp |
| Xanthan gum | ½ tsp |
| Salt (fine, sea) | 1 1/4 tsp |

* Weight percent or total amount to add.

Process:

Pressure cook 1 medium whole sweet potato until soft, about 45 minutes.

Peel sweet potato and remove fibers and particles by using a ricer or food mill.

Combine the sweet potato and water in a pot. Using an immersion blender, blend until the sweet potato particles are very fine, approx. one minute.

To pasteurize, heat the mixture to 180 degrees F. (82.2 degrees C.) and hold for 6 minutes.

Allow the mixture to cool to incubation temperature, for our commercially prepared lactic acid bacteria, a temperature of 100-110 degrees F. (37.8-43.3 degrees C.) is required.

Add yogurt culture. Whisk vigorously to ensure even distribution of culture in the mixture.

Incubate until desired fermentation has been achieved. We incubated in a Cuisine brand Yogurt and Greek Yogurt Maker for 6 hours.

The Fermented Sweet potato base for the Meltable Cheddar Cheese alternative is complete. Reserve one cup.

Dissolve agar-agar flakes into filtered water, approx. 5 minutes.

Melt coconut oil until liquid. We used a microwave oven.

Combine dissolved agar-agar and coconut oil in a small saucepan and stir to combine.

Add Fermented Sweet Potato to the pan, whisk vigorously to combine thoroughly.

Heat mixture to approx. 200 degrees F. (93.3 degrees C.), do not allow to boil.

Add salt and stir.

Add nutritional yeast, olive oil, miso paste, and citric acid. Whisk continuously until well combined. Continue to whisk while adding tapioca flower and xanthan gum for 5 minutes or until mixture becomes thick and stretchy.

Place mixture into dish or mold and allow to cool to room temperature.

The product is now ready for consumption or storage in refrigeration.

Example 7: Wild Fermented Sweet Potato Parmesan Style Cheese Alternative

| Ingredients: | Amount* |
|---|---|
| Raw Murasaki Sweet Potato | 91.85% (1 lb.) |
| Fine Sea Salt | 2.99% (2 tsp) |
| Grapeseed oil | 1.37% (1/2 tsp) |
| Nutritional yeast | 3.79% (4 tbsp) |

* Weight percent or total amount to add.

Process:
  Peel and shred raw sweet potatoes into a bowl.
  Mix salt into sweet potato shreds until thoroughly coated.
  Place mixture into a glass Mason jar.
  Keep at room temperature (15.5-24 degrees C.) and shake vigorously for 20 seconds every 24 hours. Ferment for approximately 72 hours.
  Place mixture into double layers of cheese cloth and squeeze out excess liquid from mixture.
  Spread thin layer of sweet potato shreds in food dehydrator. Dehydrate, set on 125 degrees F. (51.7 degrees C.) for 2 hours until sweet potato shreds are dry to touch and slightly chewy. We used an Excaliber brand 5 tray food dehydrator.
  Blend in food processor 30 seconds, or until finely ground.
  Add oil. Process 10 seconds.
  Add nutritional yeast. Process 20 seconds.
  The product is ready for consumption or storage.

INCORPORATION BY REFERENCE

This patent application claims priority to and incorporates by reference herein in its entirety U.S. Provisional Patent Application Ser. No. 62/992,256, filed Mar. 20, 2020, titled Process for Sweet Potato Fermentation and Dairy Alternative Products Obtained.

Furthermore, all publications, patents, and patent applications mentioned in this specification are herein incorporated by reference to the same extent as if each individual publication, patent, or patent application was specifically and individually indicated to be incorporated by reference. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby. In the various embodiments of the methods and compositions of the present invention, where the term comprises is used with respect to the recited steps of the methods or components of the compositions, it is also contemplated that the methods and compositions consist essentially of, or consist of, the recited steps or components. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, because upon mixing certain components can further react or be transformed into additional materials.

All percentages and ratios used herein, unless otherwise indicated, are by weight. It is recognized the mass of an object is often referred to as its weight in everyday usage and for most common scientific purposes, but that mass technically refers to the amount of matter of an object, whereas weight refers to the force experienced by an object due to gravity. Also, in common usage the "weight" (mass) of an object is what one determines when one "weighs" (masses) an object on a scale or balance.

What is claimed is:

1. A method of making a sweet potato-based wild fermented dairy alternative food product, comprising the steps of:
    (a) weighing an amount of a raw whole, cut, sliced, chopped, or shredded sweet potato to reach a sweet potato content of about 2% to about 99.9% by weight of the food product;
    (b) optionally weighing i) an amount of salt to reach a content of 0% to about 5% by weight of the food product, ii) an amount of water to reach a liquid content of 0% to about 98% by weight of the food product, or iii) an amount of brine having a salinity content of about 0.5% to about 20% by weight of the brine to reach a liquid content of 0% to about 98% by weight of the food product; and
    (c) incubating said sweet potato weighed in step (a), or a mixture of said sweet potato weighed in step (a) and salt, water, or brine weighed in step (b), at an incubation temperature to obtain the fermented dairy alternative food product.

2. The method of claim 1 further comprising the step (d) of cooling said fermented dairy alternative food product to below 4° C. for storage.

3. The method of claim 1 wherein said sweet potato of step (a) comprises (i) naturally occurring fermentation microbes and/or (ii) said sweet potato or mixture in step (c) comprise naturally occurring fermentation microbes which naturally inoculate the mixture from within, or from the air or the surroundings.

4. A wild fermented dairy alternative food product prepared according to the method of claim 1.

5. The method of claim 1, wherein the resultant fermented dairy alternative food product is yogurt, cheese, kefir, buttermilk, sour cream, crème fraiche, fermented milk, fermented creamer, drinkable yogurt, or frozen yogurt.

6. The method of claim 1, wherein said sweet potato includes a Murasaki sweet potato cultivar.

7. The method of claim 1 further comprising the addition of one or more ingredients selected from the group consisting of flavorants, flavorings, sweeteners, acidifiers, preservatives, fats, oils, nutritional supplements, texturizing agents, thickeners, and combinations thereof.

8. The method of claim 1, wherein said incubation temperature is about 43° C.

9. The method of claim 8, wherein said incubation step (c) is run for about 8 hours.

10. The method of claim 1, wherein said incubation temperature is from about 15.5° C. to about 24° C.

11. The method of claim 10, wherein said incubation step (c) is run for about 24 hours to about 1 month.

12. The method of claim 10, wherein said incubation step (c) is run for about 24 hours to about 72 hours.

13. The method of claim 10, wherein said incubation step (c) is run for about 72 hours.

14. The method of claim 10, wherein the sweet potato weighed in step (a), or a mixture of said sweet potato weighed in step (a) and salt, water, or brine weighed in step (b), is blended prior to incubation to produce a smooth mixture.

15. The method of claim 14, further comprising straining the smooth mixture to remove undesirable particles.

\* \* \* \* \*